(12) United States Patent
Rico Alvarino et al.

(10) Patent No.: US 11,197,210 B2
(45) Date of Patent: Dec. 7, 2021

(54) RADIO RESOURCE MANAGEMENT FOR PAGING IN A NON-ANCHOR CARRIER

(71) Applicant: QUALCOMM Incorporated, San Diego, CA (US)

(72) Inventors: Alberto Rico Alvarino, San Diego, CA (US); Le Liu, Fremont, CA (US); Umesh Phuyal, San Diego, CA (US); Mungal Singh Dhanda, Slough (GB); Raghavendra Shyam Ananda, Hyderabad (IN); Srikanth Menon, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 16/507,820

(22) Filed: Jul. 10, 2019

(65) Prior Publication Data

US 2020/0029256 A1 Jan. 23, 2020

(30) Foreign Application Priority Data

Jul. 19, 2018 (IN) .............................. 201841027022
Oct. 5, 2018 (IN) .............................. 201841037797

(51) Int. Cl.
*H04W 36/00* (2009.01)
*H04W 36/08* (2009.01)
(Continued)

(52) U.S. Cl.
CPC ....... *H04W 36/0058* (2018.08); *H04W 24/08* (2013.01); *H04W 36/0085* (2018.08);
(Continued)

(58) Field of Classification Search
CPC . H04W 36/0085; H04W 36/08; H04W 24/08; H04W 72/0453; H04W 76/28;
(Continued)

(56) References Cited

U.S. PATENT DOCUMENTS 8,391,192 B2 * 3/2013 Prakash ................ H04W 36/30
370/310
9,258,769 B2 * 2/2016 Ore ....................... H04W 48/20
(Continued)

FOREIGN PATENT DOCUMENTS

WO 2018027933 A1 2/2018

OTHER PUBLICATIONS

Ericsson: "Relaxed Monitoring in NB-IoT", 3GPP Draft; R2-1708273 Relaxed Monitoring in NB-IoT, 3rd Generation Partnership Project (3GPP), vol. RAN WG2, No. Berlin, Germany; Aug. 21, 2017-Aug. 25, 2017, Aug. 20, 2017 (Aug. 20, 2017), pp. 1-10, XP051318173, Retrieved from the Internet: URL: http://www.3gpp.org/ftp/Meetings_3GPP_SYNC/RAN2/Docs/ [retrieved on Aug. 20, 2017], Section 2.
(Continued)

*Primary Examiner* — Ayaz R Sheikh
*Assistant Examiner* — Tarell A Hampton
(74) *Attorney, Agent, or Firm* — QUALCOMM Incorporated

(57) ABSTRACT

Various aspects of the present disclosure generally relate to wireless communication. In some aspects, a user equipment may receive information indicating whether measurement is permitted on a non-anchor carrier; and selectively perform a measurement on at least one of the non-anchor carrier or an anchor carrier, based at least in part on the information indicating whether the measurement is permitted on the non-anchor carrier. Numerous other aspects are provided.

32 Claims, 10 Drawing Sheets

(51) Int. Cl.
*H04W 24/08* (2009.01)
*H04W 72/04* (2009.01)
*H04W 76/28* (2018.01)
*H04W 68/00* (2009.01)

(52) U.S. Cl.
CPC ......... *H04W 36/08* (2013.01); *H04W 68/005* (2013.01); *H04W 72/0453* (2013.01); *H04W 76/28* (2018.02)

(58) Field of Classification Search
CPC ... H04W 68/005; H04W 48/12; H04W 48/20; H04W 24/10; H04L 5/001
See application file for complete search history.

(56) References Cited

U.S. PATENT DOCUMENTS

| | | | | |
|---|---|---|---|---|
| 2007/0091817 | A1* | 4/2007 | Yoon | H04W 28/06 370/252 |
| 2010/0222060 | A1* | 9/2010 | Zhang | H04W 36/30 455/436 |
| 2010/0272004 | A1* | 10/2010 | Maeda | H04W 72/0466 370/312 |
| 2010/0303039 | A1* | 12/2010 | Zhang | H04W 36/0072 370/331 |
| 2011/0212693 | A1* | 9/2011 | Sagfors | H04W 36/00835 455/67.11 |
| 2011/0274066 | A1* | 11/2011 | Tee | H04L 5/0053 370/329 |
| 2011/0281601 | A1* | 11/2011 | Ahn | H04L 1/0026 455/500 |
| 2012/0014306 | A1* | 1/2012 | Pelletier | H04W 52/0216 370/311 |
| 2012/0294694 | A1* | 11/2012 | Garot | F27D 1/141 411/427 |
| 2016/0205579 | A1* | 7/2016 | Cheng | H04L 5/14 370/252 |
| 2018/0124644 | A1 | 5/2018 | Rico et al. | |
| 2018/0242179 | A1* | 8/2018 | Rathonyi | H04W 72/048 |
| 2018/0352590 | A1* | 12/2018 | Sha | H04W 72/0453 |
| 2019/0090149 | A1* | 3/2019 | Liu | H04W 4/70 |
| 2019/0166578 | A1* | 5/2019 | Chang | H04W 68/06 |
| 2019/0223212 | A1* | 7/2019 | Xiao | H04W 74/008 |
| 2019/0246371 | A1* | 8/2019 | Hwang | H04W 4/80 |
| 2019/0261387 | A1* | 8/2019 | Fodor | H04W 16/14 |
| 2019/0349889 | A1* | 11/2019 | Lu | H04W 72/005 |
| 2019/0364601 | A1* | 11/2019 | Kazmi | H04W 16/26 |
| 2020/0099437 | A1* | 3/2020 | Harada | H04W 76/19 |
| 2020/0100190 | A1* | 3/2020 | Hoglund | H04W 72/0486 |
| 2020/0245303 | A1* | 7/2020 | Hwang | H04W 72/04 |

OTHER PUBLICATIONS

International Search Report and Written Opinion—PCT/US2019/041422—ISA/EPO—dated Sep. 24, 2019.

Qualcomm Incorporated: "On NB-IoT RRM measurements in non-anchor carrier", 3GPP Draft; R4-1906964 on NB-IoT RRM measurements in non-anchor carrier, 3rd Generation Partnership Project (3GPP), Mobile Competence Centre ; 650, Route Des Lucioles ; F-06921 Sophia-Antipolis Cedex ; France, vol. RAN WG4, No. Reno, USA; May 13, 2019-May 17, 2019 May 13, 2019, XP051733818, Retrieved from the Internet: URL:http://www.3gpp.org/ftp/Meetings%5F3GPP%5FSYNC/RAN4/Docs/R4%2D1906964%2Ezip [retrieved on May 13, 2019], 4 pages.

Qualcomm Incorporated: "Presence of NRS on a non-anchor for Paging", 3GPP Draft; R1-1809036 Presence of NRS on a non-anchor for Paging, 3rd Generation Partnership Project (3GPP), Mobile Competence Centre ; 650, Route Des Lucioles ; F-06921 Sophia-Antipolis Cedex ; France, vol. RAN WG1, No. Gothenburg, Sweden; Aug. 20, 2018-Aug. 24, 2018 Aug. 11, 2018, XP051516408, Retrieved from the Internet: URL:http://www.3gpp.org/ftp/tsg%5Fran/WG1%5FRL1/TSGR1%5F94/Docs/R1%2D1809036%2Ezip [retrieved on Aug. 11, 2018], 3 pages.

Telekom Research & Development SDN BHD: "Further Consideration of NB-IoT Small Cell Support", 3GPP Draft; R2-1712283, 3rd Generation Partnership Project (3GPP), Mobile Competence Centre ; 650, Route Des Lucioles ; F-06921 Sophia-Antipolis Cedex ; France, vol. RAN WG2, No. Reno, Nevada, USA; Nov. 27, 2017-Dec. 1, 2017, Nov. 14, 2017, XP051370889, Retrieved from the Internet: URL:http://www.3gpp.org/ftp/tsg%5Fran/WG2%5FRL2/TSGR2%5F100/Docs/ [retrieved on Nov. 14, 2017], 3 pages.

* cited by examiner

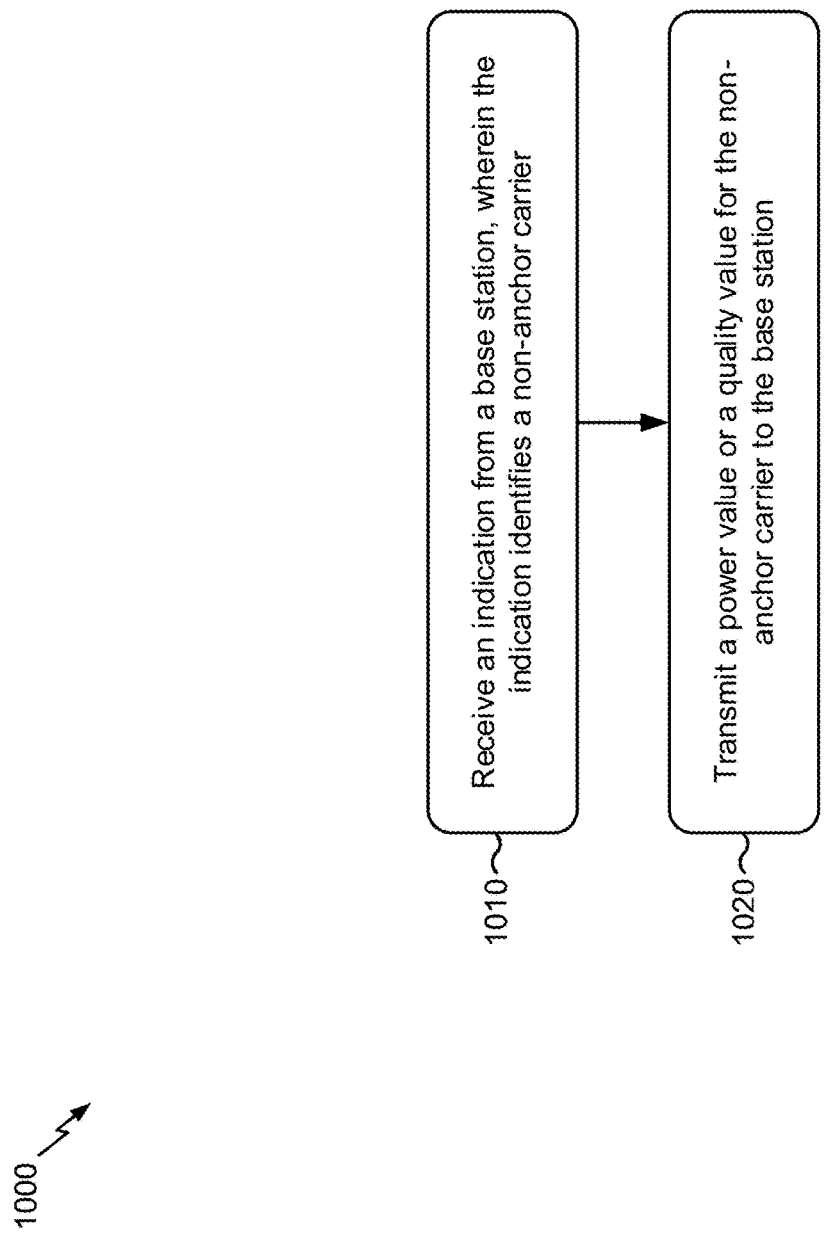

RADIO RESOURCE MANAGEMENT FOR PAGING IN A NON-ANCHOR CARRIER

CROSS-REFERENCE TO RELATED APPLICATIONS UNDER 35 U.S.C. § 119

This application claims priority to. India Patent Application No. 201841027022, filed on Jul. 19, 2018, entitled "RADIO RESOURCE MANAGEMENT FOR PAGING IN A NON-ANCHOR CARRIER," and to India Patent Application No. 201841037797, filed on Oct. 5, 2018, entitled "RADIO RESOURCE MANAGEMENT FOR PAGING IN A NON-ANCHOR CARRIER," which is hereby expressly incorporated by reference herein.

TECHNICAL FIELD OF THE DISCLOSURE

Aspects of the technology described below generally relate to wireless communication and to techniques and apparatuses for radio resource management for paging in a non-anchor carrier. Some techniques and apparatuses described herein enable and provide wireless communication devices and systems configured for conserved device power and increased reliability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication, performed by a user equipment (UE), may include receiving information indicating whether measurement is permitted on a non-anchor carrier; and selectively performing a measurement on at least one of the non-anchor carrier or an anchor carrier based at least in part on the information indicating whether the measurement is permitted on the non-anchor carrier.

In some aspects, a UE for wireless communication may include memory and one or more processors operatively coupled to the memory. The memory and the one or more processors may be configured to receive information indicating whether measurement is permitted on a non-anchor carrier; and selectively perform a measurement on at least one of the non-anchor carrier or an anchor carrier based at least in part on the information indicating whether the measurement is permitted on the non-anchor carrier.

In some aspects, a non-transitory computer-readable medium may store one or more instructions for wireless communication. The one or more instructions, when executed by one or more processors of a UE, may cause the one or more processors to receive information indicating whether measurement is permitted on a non-anchor carrier; and selectively perform a measurement on at least one of the non-anchor carrier or an anchor carrier based at least in part on the information indicating whether the measurement is permitted on the non-anchor carrier.

In some aspects, an apparatus for wireless communication may include means for receiving information indicating whether measurement is permitted on a non-anchor carrier; and means for selectively performing a measurement on at least one of the non-anchor carrier or an anchor carrier, based at least in part on the information indicating whether the measurement is permitted on the non-anchor carrier.

In some aspects, a method of wireless communication, performed by a UE, may include determining that a measurement value for a non-anchor carrier or a change in the measurement value satisfies a threshold; and skipping a measurement for an anchor carrier based at least in part on determining that the measurement value or the change in the measurement value for the non-anchor carrier satisfies the threshold.

In some aspects, a UE for wireless communication may include memory and one or more processors operatively coupled to the memory. The memory and the one or more processors may be configured to determine that a measurement value for a non-anchor carrier or a change in the measurement value satisfies a threshold; and skip a measurement for an anchor carrier based at least in part on determining that the measurement value or the change in the measurement value for the non-anchor carrier satisfies the threshold.

In some aspects, a non-transitory computer-readable medium may store one or more instructions for wireless communication. The one or more instructions, when executed by one or more processors of a UE, may cause the one or more processors to determine that a measurement value for a non-anchor carrier or a change in the measurement value satisfies a threshold; and skip a measurement for an anchor carrier based at least in part on determining that the measurement value or the change in the measurement value for the non-anchor carrier satisfies the threshold.

In some aspects, an apparatus for wireless communication may include means for determining that a measurement value for a non-anchor carrier or a change in the measurement value satisfies a threshold; and means for skipping a measurement for an anchor carrier based at least in part on determining that the measurement value or the change in the measurement value for the non-anchor carrier satisfies the threshold.

In some aspects, a method of wireless communication, performed by a UE, may include determining one or more power values for an anchor carrier and a non-anchor carrier and one or more quality values for the anchor carrier and the non-anchor carrier; and performing a cell selection or a cell reselection based at least in part on the one or more power values and the one or more quality values.

In some aspects, a UE for wireless communication may include memory and one or more processors operatively coupled to the memory. The memory and the one or more processors may be configured to determine one or more power values for an anchor carrier and a non-anchor carrier and one or more quality values for the anchor carrier and the non-anchor carrier; and perform a cell selection or a cell reselection based at least in part on the one or more power values and the one or more quality values.

In some aspects, a non-transitory computer-readable medium may store one or more instructions for wireless communication. The one or more instructions, when executed by one or more processors of a UE, may cause the one or more processors to determine one or more power values for an anchor carrier and a non-anchor carrier and one or more quality values for the anchor carrier and the non-anchor carrier; and perform a cell selection or a cell reselection based at least in part on the one or more power values and the one or more quality values.

In some aspects, an apparatus for wireless communication may include means for determining one or more power values for an anchor carrier and a non-anchor carrier and one or more quality values for the anchor carrier and the non-anchor carrier; and performing a cell selection or a cell reselection based at least in part on the one or more power values and the one or more quality values.

In some aspects, a method of wireless communication, performed by a UE, may include receiving an indication from a base station, wherein the indication identifies a non-anchor carrier; and transmitting a power value or a quality value for the non-anchor carrier to the base station.

In some aspects, a UE for wireless communication may include memory and one or more processors operatively coupled to the memory. The memory and the one or more processors may be configured to receive an indication from a base station, wherein the indication identifies a non-anchor carrier; and transmit a power value or a quality value for the non-anchor carrier to the base station.

In some aspects, a non-transitory computer-readable medium may store one or more instructions for wireless communication. The one or more instructions, when executed by one or more processors of a UE, may cause the one or more processors to receive an indication from a base station, wherein the indication identifies a non-anchor carrier; and transmit a power value or a quality value for the non-anchor carrier to the base station.

In some aspects, an apparatus for wireless communication may include means for receiving an indication from a base station, wherein the indication identifies a non-anchor carrier; and transmitting a power value or a quality value for the non-anchor carrier to the base station.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is another diagram illustrating an example process performed, for example, by a user equipment, in accordance with various aspects of the present disclosure.

DETAILED DESCRIPTION

Figure 1:
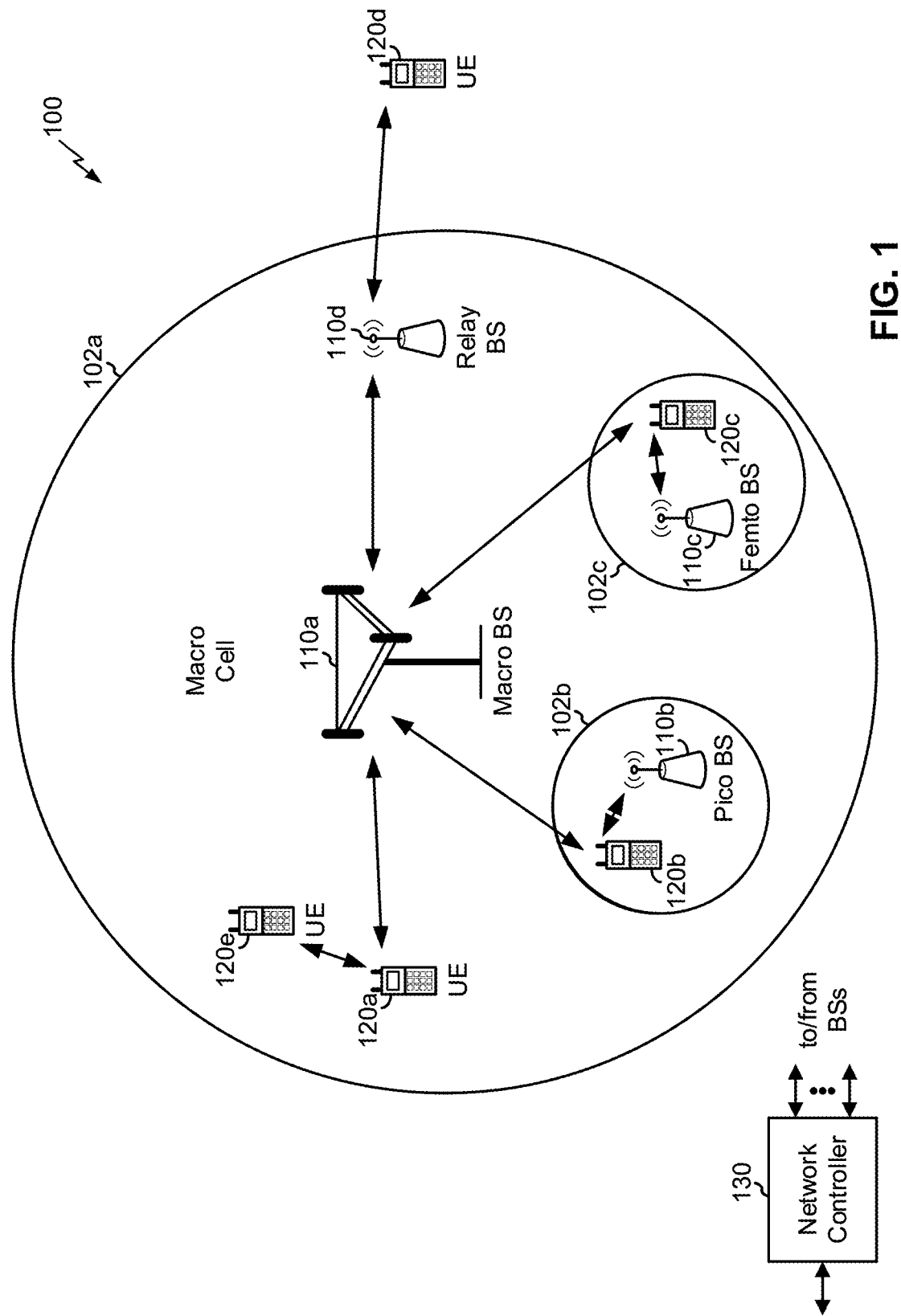
FIG. 1 is a block diagram conceptually illustrating an example of a wireless communication network, in accordance with various aspects of the present disclosure.

A UE may receive a synchronization signal (e.g., a primary synchronization signal (PSS), a secondary synchronization signal (SSS), a physical broadcast channel (PBCH), a narrowband primary synchronization signal (NPSS), a narrowband secondary synchronization signal (NSSS), a narrowband physical broadcast channel (NPBCH), and/or the like) and/or system information (e.g., a master information block (MIB), a system information block (SIB), and/or the like) in an anchor carrier. In some aspects, the UE may receive a paging message in the anchor carrier. Receiving a paging message may be referred to herein as paging.

Some technologies may allow the use of non-anchor carriers (e.g., a carrier that does not include a synchronization signal or system information) to provide paging. For example, the narrowband Internet of Things (NB-IoT) standard as defined, for example, in Release 14 of 3GPP Technical Specification (TS) 36.304, may provide for the use of a non-anchor carrier (e.g., a carrier that does not include a narrowband PSS (NPSS), a narrowband SSS (NSSS), a narrowband PBCH (NPBCH), a SIB, and/or the like) to provide paging. In such a case, a UE may select a carrier in which to receive paging based at least in part on a UE identifier of the UE.

In some aspects, the UE may still perform measurement or cell reselection based at least in part on an anchor carrier, even when a non-anchor carrier is selected. For UEs that monitor paging in a non-anchor carrier, power consumption and wake-up time may be increased in comparison to UEs that monitor paging in an anchor carrier, since the non-anchor carrier UEs must wake up, tune to the anchor carrier, perform a measurement, and tune back to the non-anchor to decode paging. Furthermore, in some cases, the quality of the anchor carrier may be acceptable, but the quality of the non-anchor carrier may be below a desired threshold (e.g., due to narrowband interference, such as from an illegal repeater). In this case, the UE may camp on a cell that appears suitable in view of the condition of the anchor carrier, but may receive paging on a non-anchor carrier that suffers from strong interference, thus rendering the UE unreachable using paging.

Some techniques and apparatuses described herein may provide radio resource management (RRM) procedures using non-anchor carriers. For example, some techniques and apparatuses described herein may use a narrowband reference signal (NRS) transmitted on the non-anchor carrier for RRM purposes in order to perform or configure measurement, cell selection, and/or cell reselection using a non-anchor carrier and/or an anchor carrier.

In some aspects, techniques and apparatuses described herein may perform cell selection or reselection based at least in part on a measurement on at least one of a non-anchor carrier or an anchor carrier. For example, a base station may indicate whether measurement on a non-anchor carrier is allowed, and a UE may determine whether to perform measurements (e.g., for cell selection, cell reselection, and/or the like) on the anchor carrier on the non-anchor carrier. This may provide for configuration of the UE not to monitor the non-anchor carrier, for example, in a situation where interference on the non-anchor carrier is significant, thus improving air interface performance. In some aspects, the UE may enter a relaxed monitoring state with regard to the anchor carrier (e.g., based at least in part on a measurement for the anchor carrier and/or the non-anchor carrier), and may therefore cease monitoring of the anchor carrier. In such a case, the UE may continue to perform measurements on the non-anchor carrier, and may determine whether relaxed monitoring criteria are satisfied based at least in part on the non-anchor carrier measurement. In this way, the UE may selectively monitor or perform measurement for the anchor carrier and/or the non-anchor carrier based at least in part on the relaxed monitoring criteria.

In some aspects, techniques and apparatuses described herein may perform measurements in the anchor carrier, and may skip some measurements (e.g., determine not to perform one or more measurements, may perform relaxed monitoring, and/or the like) if a measurement of the non-anchor carrier satisfies a condition. For example, some techniques and apparatuses described herein may determine that the anchor carrier and/or the non-anchor carrier are in a steady state (defined elsewhere herein), and may perform relaxed monitoring accordingly. As another example, some techniques and apparatuses described herein may determine that a measurement value for a non-anchor carrier satisfies a threshold, and may determine not to perform one or more measurements for the anchor carrier when the measurement satisfies the threshold. In this way, wake-up time and resource consumption are reduced that would otherwise be used in connection with performing measurement for the anchor carrier.

In some aspects, techniques and apparatuses described herein may perform cell selection and/or cell reselection based at least in part on a quality and/or power measurement value for the anchor carrier and the non-anchor carrier. For example, techniques and apparatuses described herein may use cell selection and/or reselection criteria that are based at least in part on quality and/or power levels for the anchor carrier and the non-anchor carrier. This may reduce the likelihood of selecting or reselecting a cell with a non-anchor carrier that is associated with unacceptable interference, thereby improving radio interface performance.

In some aspects, techniques and apparatuses described herein may provide information to a base station relating to a quality and/or power level of a non-anchor carrier. For example, the UE may provide quality and/or power level measurements for a non-anchor carrier based at least in part on an instruction or indication, from a BS, to provide measurements for the non-anchor carrier. By configuring many UEs to provide such measurements, the BS may identify non-anchor carriers associated with interference, and may reconfigure appropriately, thereby reducing interference and improving network performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, artificial intelligence enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency (RF)-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
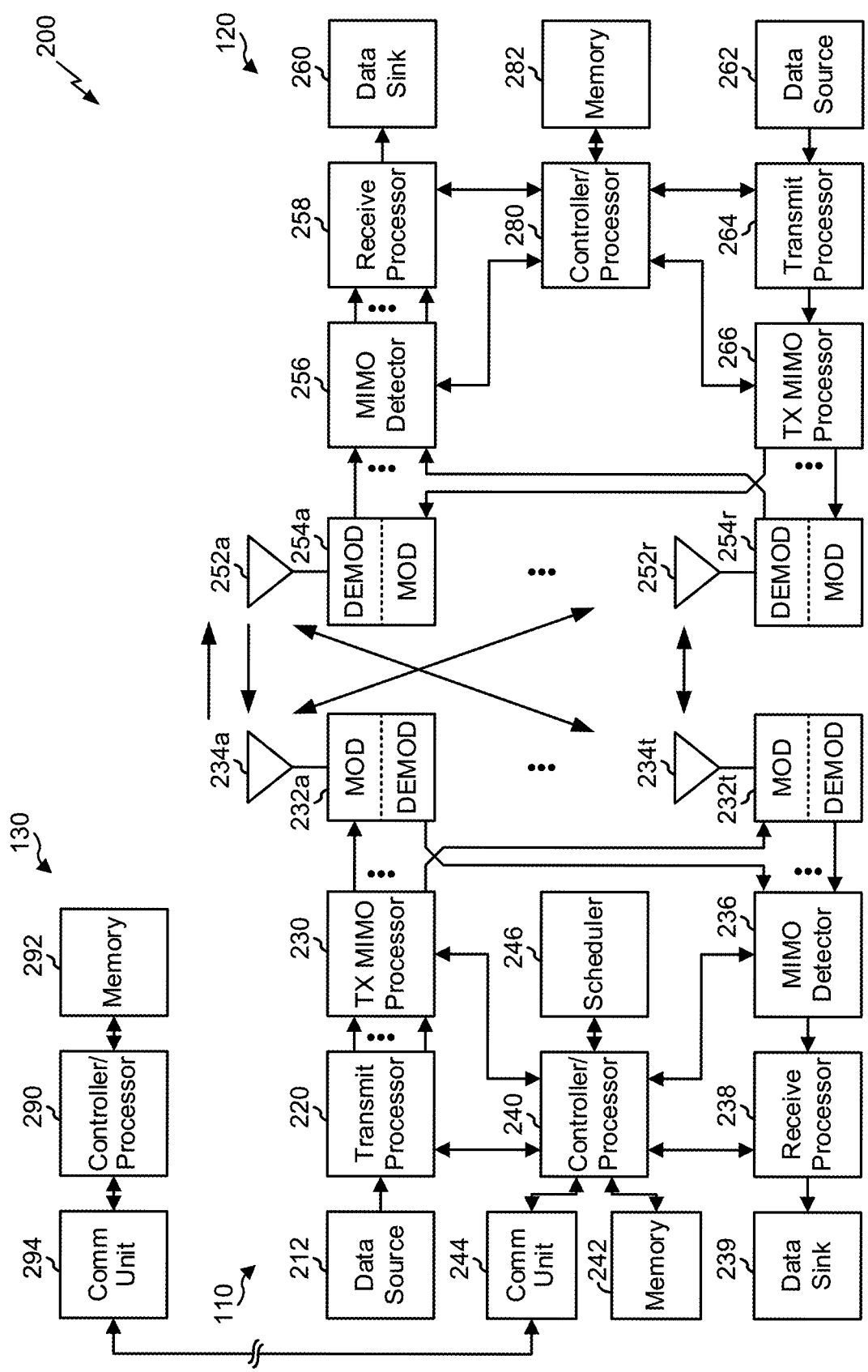
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with RRM for paging in a non-anchor carrier, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving information indicating whether measurement is permitted on a non-anchor carrier; means for selectively performing a measurement on at least one of the non-anchor carrier or an anchor carrier based at least in part on the information indicating whether the measurement is permitted on the non-anchor carrier; means for performing a cell selection or cell reselection procedure based at least in part on the measurement; means for receiving information identifying the one or more parameters; means for determining a value for the anchor carrier based at least in part on performing the measurement on the non-anchor carrier; means for determining a value for the non-anchor carrier based at least in part on performing the measurement on the anchor carrier; means for performing a measurement on the anchor carrier according to a periodicity or a discontinuous reception cycle of the UE; means for determining that a measurement value for a non-anchor carrier or a change in the measurement value satisfies a threshold; means for skipping a measurement for an anchor carrier based at least in part on determining that the measurement value or the change in the measurement value for the non-anchor carrier satisfies the threshold; means for determining that a change in a measurement value for the anchor carrier satisfies a corresponding threshold, wherein skipping the measurement for the anchor carrier is further based at least in part on determining that the change in the measurement value for the anchor carrier satisfies the corresponding threshold; means for determining that a change in a measurement value for the anchor carrier satisfies a corresponding threshold; means for determining the threshold for the non-anchor carrier based at least in part on determining that the change in the measurement value for the anchor carrier satisfies the corresponding threshold; means for determining that the measurement value for the non-anchor carrier does not satisfy the threshold; means for performing the measurement for the anchor carrier based at least in part on the measurement value for the non-anchor carrier not satisfying the threshold; means for adjusting the threshold for a period of time; means for skipping a subset of measurements of the periodic measurement; means for performing at least one measurement of the periodic measurement based at least in part on a discontinuous reception cycle of the UE; means for determining one or more power values for an anchor carrier and a non-anchor carrier and one or more quality values for the anchor carrier and the non-anchor carrier; means for performing a cell selection or a cell reselection based at least in part on the one or more power values and the one or more quality values; means for determining a power value and/or a quality value for an anchor carrier of a neighbor cell, wherein performing the cell reselection is based at least in part on the power value and/or the quality value; means for storing the one or more power values for the non-anchor carrier or the one or more quality values for the non-anchor carrier for a length of time; means for receiving an indication from a base station, wherein the indication identifies a non-anchor carrier; means for transmitting a power value or a quality value for the non-anchor carrier to the base station; means for monitoring paging on a particular carrier based at least in part on a second indication received from the base station, wherein the second indication is based at least in part on the power value or the quality value; means for monitoring the paging on the particular carrier for a particular length of time; means for transmitting information identifying at least one of an access failure, a radio link failure, or a paging failure to the base station; and/or the like. In some aspects, such means may include one or more components of UE 120 described in connection with FIG. 2.

As indicated above, FIG. 2 is provided as an example. Other examples may differ from what is described with regard to FIG. 2.

A UE may receive a synchronization signal (e.g., a primary synchronization signal (PSS), a secondary synchronization signal (SSS), a physical broadcast channel (PBCH), a narrowband primary synchronization signal (NPSS), a narrowband secondary synchronization signal (NSSS), a narrowband physical broadcast channel (NPBCH), and/or the like) and/or system information (e.g., a master information block (MIB), a system information block (SIB), and/or the like) in an anchor carrier. In some aspects, the UE may receive a paging message in the anchor carrier. Receiving a paging message may be referred to herein as paging.

Some technologies may allow the use of non-anchor carriers (e.g., a carrier that does not include a synchronization signal or system information) to provide paging. For example, the narrowband Internet of Things (NB-IoT) standard as defined, for example, in Release 14 of 3GPP Technical Specification (TS) 36.304, may provide for the use of a non-anchor carrier (e.g., a carrier that does not include a narrowband PSS (NPSS), a narrowband SSS (NSSS), a narrowband PBCH (NPBCH), a SIB, and/or the like) to provide paging. In such a case, a UE may select a carrier in which to receive paging based at least in part on a UE identifier of the UE.

In some aspects, the UE may still perform measurement or cell reselection based at least in part on an anchor carrier, even when a non-anchor carrier is selected. For UEs that monitor paging in a non-anchor carrier, power consumption and wake-up time may be increased in comparison to UEs that monitor paging in an anchor carrier, since the non-anchor carrier UEs must wake up, tune to the anchor carrier, perform a measurement, and tune back to the non-anchor to decode paging. Furthermore, in some cases, the quality of the anchor carrier may be acceptable, but the quality of the non-anchor carrier may be below a desired threshold (e.g., due to narrowband interference, such as from an illegal repeater). In this case, the UE may camp on a cell that appears suitable in view of the condition of the anchor carrier, but may receive paging on a non-anchor carrier that suffers from strong interference, thus rendering the UE unreachable using paging.

Some techniques and apparatuses described herein may provide radio resource management (RRM) procedures using non-anchor carriers. For example, some techniques and apparatuses described herein may use a narrowband reference signal (NRS) transmitted on the non-anchor carrier for RRM purposes in order to perform or configure measurement, cell selection, and/or cell reselection using a non-anchor carrier and/or an anchor carrier.

In some aspects, techniques and apparatuses described herein may perform cell selection or reselection based at least in part on a measurement on at least one of a non-anchor carrier or an anchor carrier. For example, a base station may indicate whether measurement on a non-anchor carrier is allowed, and a UE may determine whether to perform measurements (e.g., for cell selection, cell reselection, and/or the like) on the anchor carrier on the non-anchor carrier. This may provide for configuration of the UE not to monitor the non-anchor carrier, for example, in a situation where interference on the non-anchor carrier is significant, thus improving air interface performance. In some aspects, the UE may enter a relaxed monitoring state with regard to the anchor carrier (e.g., based at least in part on a measurement for the anchor carrier and/or the non-anchor carrier), and may therefore cease monitoring of the anchor carrier. In such a case, the UE may continue to perform measurements on the non-anchor carrier, and may determine whether relaxed monitoring criteria are satisfied based at least in part on the non-anchor carrier measurement. In this way, the UE may selectively monitor or perform measurement for the anchor carrier and/or the non-anchor carrier based at least in part on the relaxed monitoring criteria.

In some aspects, techniques and apparatuses described herein may perform measurements in the anchor carrier, and may skip some measurements (e.g., determine not to perform one or more measurements, may perform relaxed monitoring, etc.) if a measurement of the non-anchor carrier satisfies a condition. For example, some techniques and apparatuses described herein may determine that the anchor carrier and/or the non-anchor carrier are in a steady state (defined elsewhere herein), and may perform relaxed monitoring accordingly. As another example, some techniques and apparatuses described herein may determine that a measurement value for a non-anchor carrier satisfies a threshold, and may determine not to perform one or more measurements for the anchor carrier when the measurement satisfies the threshold. In this way, wake-up time and resource consumption are reduced that would otherwise be used in connection with performing measurement for the anchor carrier.

In some aspects, techniques and apparatuses described herein may perform cell selection and/or cell reselection based at least in part on a quality and/or power measurement value for the anchor carrier and the non-anchor carrier. For example, techniques and apparatuses described herein may use cell selection and/or reselection criteria that are based at least in part on quality and/or power levels for the anchor carrier and the non-anchor carrier. This may reduce the likelihood of selecting or reselecting a cell with a non-anchor carrier that is associated with unacceptable interference, thereby improving radio interface performance.

In some aspects, techniques and apparatuses described herein may provide information to a base station relating to a quality and/or power level of a non-anchor carrier. For example, the UE may provide quality and/or power level measurements for a non-anchor carrier based at least in part on an instruction or indication, from a BS, to provide measurements for the non-anchor carrier. By configuring many UEs to provide such measurements, the BS may identify non-anchor carriers associated with interference, and may reconfigure appropriately, thereby reducing interference and improving network performance.

Figure 3:
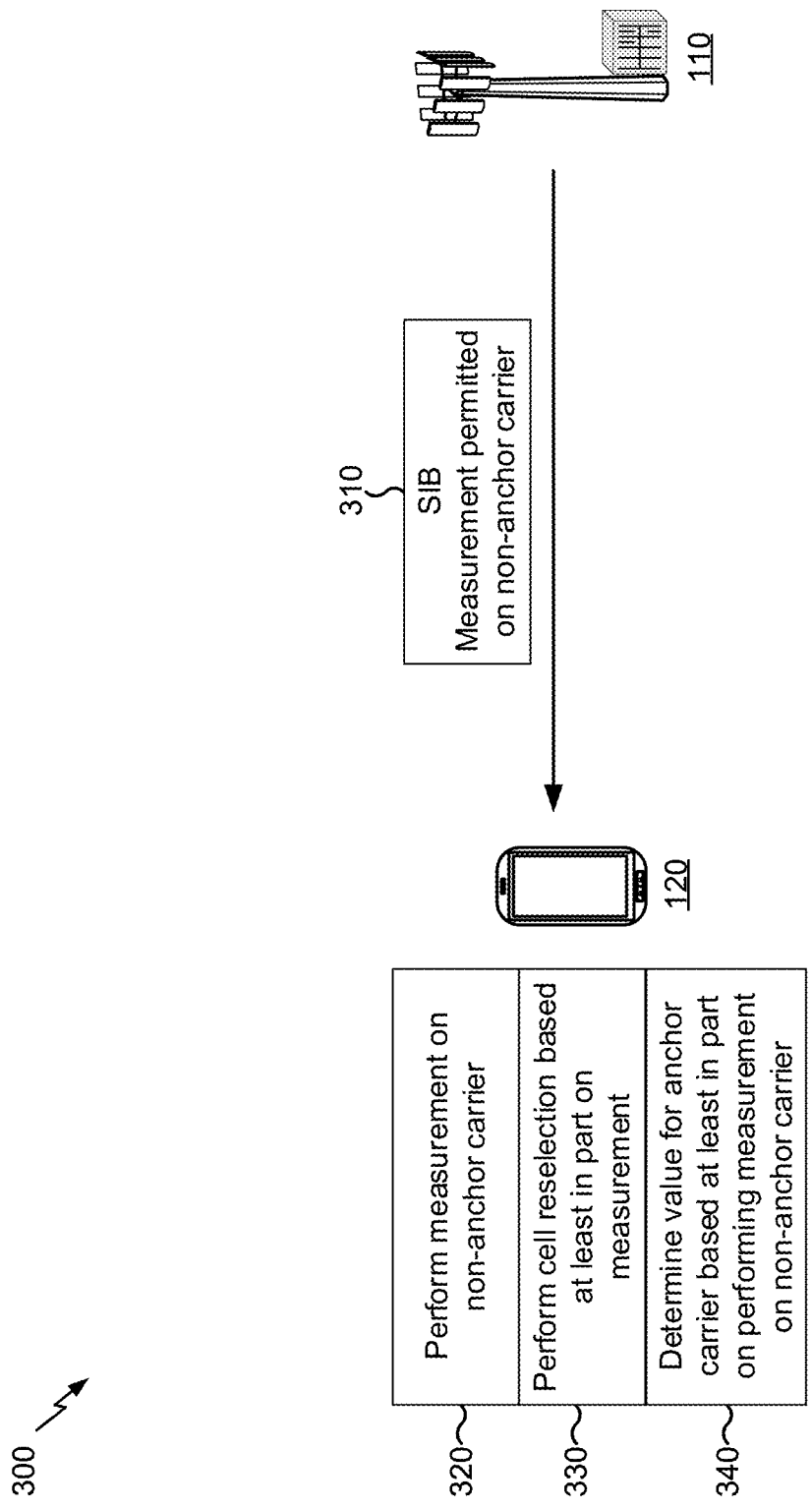
FIG. 3 is a diagram illustrating an example of RRM for paging in a non-anchor carrier, in accordance with various aspects of the present disclosure.

FIG. 3 is a diagram illustrating an example 300 of RRM for paging in a non-anchor carrier, in accordance with various aspects of the present disclosure. As shown, example 300 includes a BS 110 and a UE 120. The BS 110 may provide one or more anchor carriers and one or more non-anchor carriers for the UE 120 (e.g., for UEs 120 covered by the BS 110).

As shown in FIG. 3, and by reference number 310, the BS 110 may provide a SIB to the UE 120. As further shown, the SIB may indicate that measurement is permitted in a non-anchor carrier (e.g., a non-anchor carrier provided by the BS 110). In some aspects, the BS 110 may provide information (e.g., a SIB or information other than a SIB) indicating whether measurement is permitted on a non-anchor carrier. In some aspects, the SIB may indicate a set of non-anchor carriers for which measurement is permitted. Additionally, or alternatively, the SIB may indicate a set of non-anchor carriers for which measurement is not permitted. In some aspects, the BS 110 may provide the information indicating whether measurement is permitted on an anchor carrier. In some aspects, the BS 110 may broadcast the information indicating whether measurement is permitted.

In some aspects, the measurement may include at least one of a power measurement (e.g., to determine a power value, such as an RxLev value, a reference signal received power (RSRP), and/or the like), a quality measurement (e.g., to determine a quality value, such as a Qqual value, a reference signal received quality (RSRQ), and/or the like), and/or the like.

In some aspects, the BS 110 may provide information (e.g., with the SIB, in the SIB, or separate from the SIB) indicating a parameter associated with the measurement. For example, the BS 110 may provide information identifying a parameter (e.g., threshold, and/or the like), a configuration for cell reselection (e.g., a Srxlev parameter, a $Q_{rxlev}$ parameter, a Pcompensation parameter, a Qoffset parameter, an Squal parameter, a $Q_{qual}$ parameter, and/or the like), a configuration for measurement relaxation (e.g., a threshold and/or the like). In some aspects, the UE 120 may be configured with the parameter or configuration (e.g., based at least in part on radio resource control (RRC) messaging, downlink control information (DCI), system information (SI), an initial configuration of the UE 120, an agreement between the BS 110 and the UE 120, etc.). In some aspects, the UE 120 may receive information identifying one or more parameters for a cell selection or reselection parameters for one or more non-anchor carriers of a plurality of non-anchor carriers.

In some aspects, a parameter may be different for an anchor carrier than for a non-anchor carrier. In some aspects, a parameter may be different for one non-anchor carrier than for another non-anchor carrier. For example, the BS 110 may signal parameters per non-anchor carrier, which permits more fine-grained configuration of cell selection and/or reselection. In some aspects, a parameter or threshold may be different for cell selection than for cell reselection. As just one example, a parameter or threshold for cell reselection may be based at least in part on 3GPP TS 36.331 Clause 5.2.4.6, substantially reproduced below with internal citations omitted:

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero.<br>For inter-frequency:<br>Except for NB-IoT, equals to $Qoffset_{s,n}$ plus $Qoffset_{frequency}$, if $Qoffset_{s,n}$ is valid, otherwise this equals to $Qoffset_{frequency}$.<br>For NB-IoT equals to $QoffsetDedicated_{frequency}$ for any frequency other than the frequency of the dedicated frequency offset, if $QoffsetDedicated_{frequency}$ is valid, otherwise this equals to $Qoffset_{frequency}$ (if $QoffsetDedicated_{frequency}$ is valid $Qoffset_{frequency}$ is not used). |
| $Qoffset_{temp}$ | Offset temporarily applied to a cell |
| $Qoffset_{SCPTM}$ | Offset temporarily applied to a single cell point-to-multipoint (SC-PTM) frequency as specified below. The offset is applied to all cells on the SC-PTM frequency. If $Qoffset_{SCPTM}$ is valid, Qoffset for inter-frequency neighbour cells is not used. |

As shown by reference number 320, the UE 120 may perform a measurement on a non-anchor carrier. In some aspects, the UE 120 may determine whether to perform the measurement on the non-anchor carrier or the anchor carrier (e.g., based at least in part on a UE identifier of the UE 120, based at least in part on channel conditions, and/or the like). In some aspects, the UE 120 may perform a quality measurement and/or a power measurement. In some aspects, the UE 120 may perform the measurement for cell selection and/or cell reselection, as described in more detail below.

In some aspects, the UE 120 may perform a measurement on an anchor carrier. For example, the UE 120 may perform the measurement on the anchor carrier when the BS 110 has configured the UE 120 to perform neighbor cell measurements on the non-anchor carrier (e.g., so the UE 120 may perform measurements on both the anchor carrier and the non-anchor carrier). In such a case, the UE 120 may determine whether a measurement relaxation criterion (described elsewhere herein) is satisfied by the measurement on the anchor carrier. When the measurement relaxation criterion is satisfied, then the UE 120 may stop performing measurements on the anchor carrier, and may continue performing measurements on the non-anchor carrier. The UE 120 may furthermore determine or receive information identifying an offset between the anchor carrier and the non-anchor carrier (e.g., between measurements on the anchor carrier and the non-anchor carrier). This offset may be referred to herein as $Delta_{A-NA}$, and may be used to determine when the UE 120 is to exit the relaxed monitoring state. In some aspects, "measurement relaxation" may be used interchangeably herein with "relaxed monitoring."

As shown by reference number 330, the UE 120 may perform a cell reselection procedure based at least in part on the measurement. In some aspects, the UE 120 may perform the cell reselection procedure based at least in part on the parameters described above. As just one example, the UE 120 may perform the cell reselection procedure based at least in part on the following configuration and parameters:
Srxlev>0 and Squal>0, with
  Srxlev=$Q_{rxlevmeas}$−$Q_{rxlevmin}$−Pcompensation−$Qoffset_{temp}$
  Squal=$Q_{qualmeas}$−$Q_{qualmin}$−$Qoffset_{temp}$,
which are defined in 3GPP TS 36.331.

As shown by reference number 340, in some aspects, the UE 120 may determine a value for the anchor carrier based at least in part on performing the measurement on the non-anchor carrier. For example, the UE 120 may perform a measurement for a non-anchor carrier to determine a measurement value (e.g., a power value), and may apply an offset to the measurement value to determine a measurement value for the anchor carrier. In some aspects, the offset may be based at least in part on a power offset between the anchor carrier and the non-anchor carrier. For example, the UE 120 may receive or determine information identifying the power offset (e.g., based at least in part on a SIB, information received from the BS 110, and/or the like). In some aspects, the power offset may be the value $Delta_{A-NA}$ described above. In some aspects, the UE 120 may determine a value for the non-anchor carrier based at least in part on a measurement value for the anchor carrier. For example, the UE 120 may apply an offset to a measurement value for the anchor carrier to determine a measurement value for the non-anchor carrier. In some aspects, the offset may be the value $Delta_{A-NA}$ described above.

In some aspects, the UE 120 may perform a measurement for the anchor carrier based at least in part on a periodicity or a cycle (e.g., a discontinuous reception cycle). For example, the UE 120 may perform the measurement for the anchor carrier every N discontinuous reception cycles (N greater than or equal to 1), or may perform the measurement based at least in part on a particular periodicity.

In some aspects, the UE 120 may exit the relaxed monitoring state based at least in part on a non-anchor carrier measurement. For example, the UE 120 may determine whether a measurement relaxation criterion associated with the anchor carrier is satisfied based at least in part on a non-anchor carrier measurement (e.g., a serving cell measurement for the non-anchor carrier) and based at least in part on an offset (e.g., $Delta_{A-NA}$, by applying the offset to the non-anchor carrier measurement). For example, the UE 120 may translate a non-anchor carrier measurement to an equivalent anchor carrier measurement (e.g., using the offset) and may use the translated measurement to make the determination regarding whether to enter or exit the relaxed measurement state. In some aspects, the measurement relaxation criterion may be based at least in part on the non-anchor carrier measurement. For example, the measurement relaxation criterion may take into account the non-anchor carrier measurement and the anchor carrier measurement that is determined based at least in part on the non-anchor carrier measurement. In such a case, the cell reselection rules described elsewhere herein may apply. Thus, the UE 120 may perform measurement relaxation for the anchor carrier without configuration of new parameters. Furthermore, the techniques and apparatuses described herein may not negatively impact the performance of highly-mobile UEs, since these UEs can use anchor carrier measurements for measurement relaxation purposes.

As indicated above, FIG. 3 is provided as an example. Other examples may differ from what is described with respect to FIG. 3.

Figure 4:
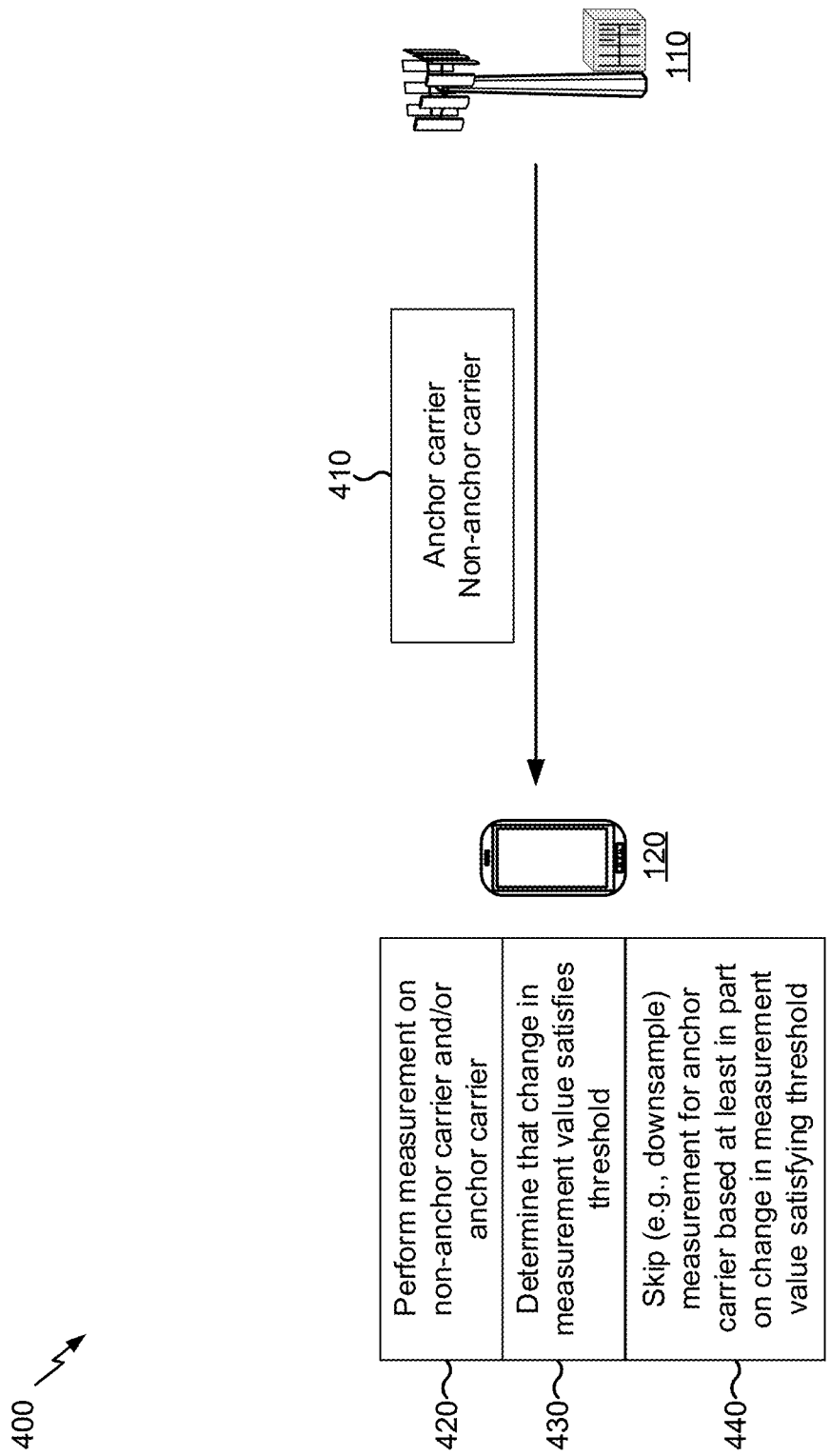
FIG. 4 is a diagram illustrating another example of RRM for paging in a non-anchor carrier, in accordance with various aspects of the present disclosure.

FIG. 4 is a diagram illustrating an example 400 of RRM for paging in a non-anchor carrier, in accordance with various aspects of the present disclosure. As shown in FIG. 4, and by reference number 410, a BS 110 may provide one or more anchor carriers and one or more non-anchor carriers for a UE 120. Example 400 relates to performing measurement based at least in part on a relaxed monitoring technique. For example, relaxed monitoring may be used (e.g., for eMTC UEs, NB-IoT UEs, and/or the like) to conserve measurement resources. When a condition of a cell or carrier (e.g., a change in a power level relative to a reference value) is in a steady state (e.g., does not change over a period of time), the UE 120 may skip one or more measurements. In such a case, the reference value may be updated periodically. In some aspects, the threshold may be configured (e.g., using a SIB and/or the like).

As shown by reference number 420, the UE 120 may perform a measurement on (e.g., in) the non-anchor carrier and/or the anchor carrier. For example, the UE 120 may perform a power measurement, a quality measurement and/or or the like. The UE 120 may perform the measurement on the non-anchor carrier and/or the anchor carrier. For example, in some aspects, the UE 120 may monitor the anchor carrier and the non-anchor carrier. In some aspects, the UE 120 may monitor the non-anchor carrier.

As shown by reference number 430, the UE 120 may determine that a change in the measurement value satisfies a threshold. For example, the UE 120 may determine that a difference between the measurement value and a reference value satisfies a threshold, indicating that the non-anchor carrier and/or the anchor carrier are in a steady state. Thus, the UE 120 may determine that a measurement relaxation technique can be performed with regard to the anchor carrier.

In some aspects, the UE 120 may determine that the measurement value satisfies the threshold. For example, the UE 120 may determine that the non-anchor carrier is associated with a threshold power value (e.g., indicating an acceptable power level), and may determine that the measurement relaxation technique is to be performed based at least in part on the measurement value satisfying the threshold. In some aspects, the threshold for the measurement value may be different than the threshold for the change in the measurement value.

In some aspects, the UE 120 may adjust the threshold based at least in part on determining that the measurement value does not satisfy the threshold. For example, when the threshold is not satisfied (e.g., when the power value is low), then the UE 120 may lower the threshold (e.g., for a length of time, for a number of discontinuous reception cycles, and/or the like). This may reduce the number of measurements on the anchor carrier, thereby conserving battery power and reducing wakeup time.

In some aspects, the UE 120 may determine the threshold or the reference value for the non-anchor carrier. For example, the UE 120 may determine that a change in the measurement value (or the measurement value) of the anchor carrier satisfies a threshold (e.g., for relaxed measurement), and may determine the threshold or the reference value for the non-anchor carrier accordingly. For example, the UE 120 may set the reference value to be equal to a current power value of the non-anchor carrier. Thus, the UE 120 may configure the reference value or threshold based at least in part on a measurement for the non-anchor carrier, which reduces signaling overhead associated with the BS 110 configuring the reference value or threshold.

As shown by reference number 440, the UE 120 may skip one or more measurements for the anchor carrier based at least in part on the change in the measurement value satisfying the threshold. In some aspects, the UE 120 may downsample a measurement for the anchor carrier (e.g., may perform X out of every Y measurements, where X and Y are integers). For example, when the measurement is a periodic measurement, the UE 120 may determine not to perform one or more measurements of the periodic measurement.

As an example, assume that a UE 120 performs a measurement according to a time T (or a number of cycles N) in the anchor carrier and according to a time T' (or a number of cycles N') in the non-anchor carrier. Assume further that the change in measurement value during these time or cycle windows does not change. In that case, the UE 120 may determine that the anchor carrier is not to be monitored for a next T" time window and/or a next N" number of cycles. In some aspects, the UE 120 may determine that the anchor carrier is to be monitored once per T" time window and/or N" cycles.

In some aspects, the UE 120 may determine that the anchor carrier is to be monitored based at least in part on a value or change in the non-anchor carrier. For example, the UE 120 may determine that the anchor carrier is to be monitored based at least in part on a measurement performed with regard to the non-anchor carrier, as described in more detail elsewhere herein.

To avoid the UE 120 entering and/or exiting the relaxed monitoring state for the anchor carrier at every measurement, the following rules may apply:

when the UE 120 is not in the relaxed monitoring state, the relaxed monitoring criteria must be satisfied for a period of $T_{searchDeltaP,NA}$. before the UE 120 enters the relaxed anchor carrier monitoring state; and when the UE 120 is in the relaxed anchor carrier monitoring state, the relaxed monitoring criteria must not be satisfied for a period of $T_{searchDeltaP,NA}$. before the UE 120 can exit the relaxed monitoring state.

Thus, ping-ponging of the UE 120 in and out of the relaxed monitoring state for the anchor carrier is reduced, thereby conserving resources of the UE 120 and the BS 110.

In some aspects, the UE 120 may determine that the anchor carrier is to be monitored based at least in part on a change in the anchor carrier. For example, when the UE 120 moves to a new cell, the UE 120 may determine that the anchor carrier is to be monitored. In some aspects, the UE 120 may monitor the anchor carrier based at least in part on a periodicity or a discontinuous reception cycle. For example, the UE 120 may monitor the anchor carrier after a particular length of time, or after a particular number of discontinuous reception cycles, irrespective of whether the UE 120 is performing relaxed monitoring.

An example of the above procedure is shown in the pseudocode provided below:

The relaxed monitoring criterion for non-anchor carriers may be fulfilled when:

$(Srxlev_{Ref,NA} - Srxlev_{NA}) < S_{SearchDeltaP,NA}$ AND $(Srxlev_{Ref} - Srxlev) < S_{SearchDeltaP}$ Where:

$Srxlev_{NA}$=current Srxlev value of the non-anchor carrier (dB).

$Srxlev_{Ref,NA}$=reference Srxlev value of the non-anchor carrier (dB), set as follows:

After selecting or reselecting a new cell, or
If $(Srxlev_{NA} - Srxlev_{Ref,NA}) > 0$, or
If the relaxed monitoring criterion has not been met for $T_{SearchDeltaP,NA}$, or
when $Srxlev_{Ref}$ is updated:
the UE shall set the value of $Srxlev_{Ref,NA}$ to the current Srxlev value of the non-anchor carrier;
$T_{SearchDeltaP,NA} = 5$ minutes, or the extended DRX (eDRX) cycle length if eDRX is configured and the eDRX cycle length is longer than 5 minutes.

As indicated above, FIG. 4 is provided as an example. Other examples may differ from what is described with respect to FIG. 4.

Figure 5:
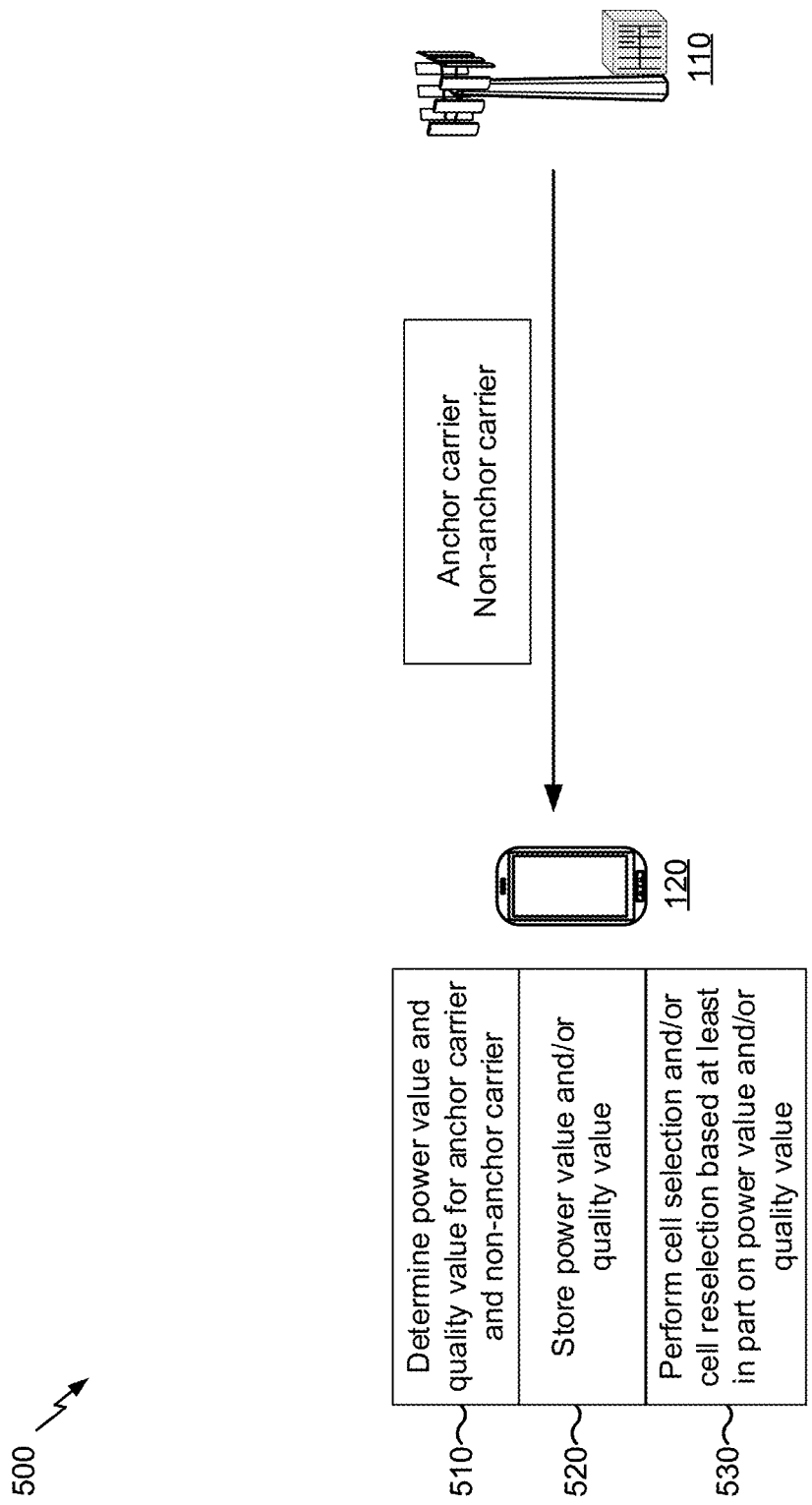
FIG. 5 is a diagram illustrating another example of RRM for paging in a non-anchor carrier, in accordance with various aspects of the present disclosure.

FIG. 5 is a diagram illustrating an example 500 of RRM for paging in a non-anchor carrier, in accordance with various aspects of the present disclosure. As shown in FIG. 5, a BS 110 may provide one or more anchor carriers and one or more non-anchor carriers for a UE 120.

As shown by reference number 510, the UE 120 may determine a power value and a quality value for the anchor carrier and for the non-anchor carrier. For example, the UE 120 may determine a power value for the anchor carrier, a quality value for the anchor carrier, a power value for the non-anchor carrier, and a quality value for the non-anchor carrier. The power value may include, for example, RxLev, RSRP, and/or the like. The quality value may include, for example, RSRQ, Qqual, and/or the like. In some aspects, the UE 120 may determine one or more of the above measurements for a neighbor cell. For example, the UE 120 may determine a measurement for an anchor carrier of a neighbor cell. This may enable cell reselection based at least in part on the measurement for the anchor carrier of the neighbor cell.

As shown by reference number 520, the UE 120 may store the power value and/or the quality value. For example, the UE 120 may store a measurement of a non-anchor carrier of a previous serving cell of the UE 120. This measurement may be referred to as $T_{NA\_meas\_valid}$. In some aspects, the UE 120 may store the measurement for a length of time. The UE 120 may use the stored measurement to perform cell reselection, as described in more detail below. This may reduce the likelihood of a ping-pong effect wherein the UE 120 ping-pongs between a serving cell associated with a poor non-anchor carrier measurement and a good anchor carrier measurement, and a neighbor cell associated with a poor anchor carrier measurement. For example, when considering the suitability of the neighbor cell for reselection, the UE 120 may consider the non-anchor carrier measurement as valid and may apply the reselection rules as described above. These stored non-anchor measurements may be invalidated once a timer or time period associated with $T_{NA\_meas\_valid}$ expires.

As shown by reference number 530, the UE 120 may perform cell selection and/or cell reselection based at least in part on the power value and/or the quality value. For example, the UE 120 may determine whether the power value and/or the quality value for the anchor carrier and the non-anchor carrier satisfy a threshold. In some aspects, the UE 120 may perform cell selection and/or reselection based at least in part on a suitability criterion, such as the following: Srxlev>0 AND Squal>0 AND $Srxlev_{NA}$>0 AND $Squal_{NA}$>0, wherein Srxlev is a power value of the anchor carrier, Squal is a quality value of the anchor carrier, $Srxlev_{NA}$ is a power level of the non-anchor carrier, and $Squal_{NA}$ is a quality value of the non-anchor carrier.

As indicated above, FIG. 5 is provided as an example. Other examples may differ from what is described with respect to FIG. 5.

Figure 6:
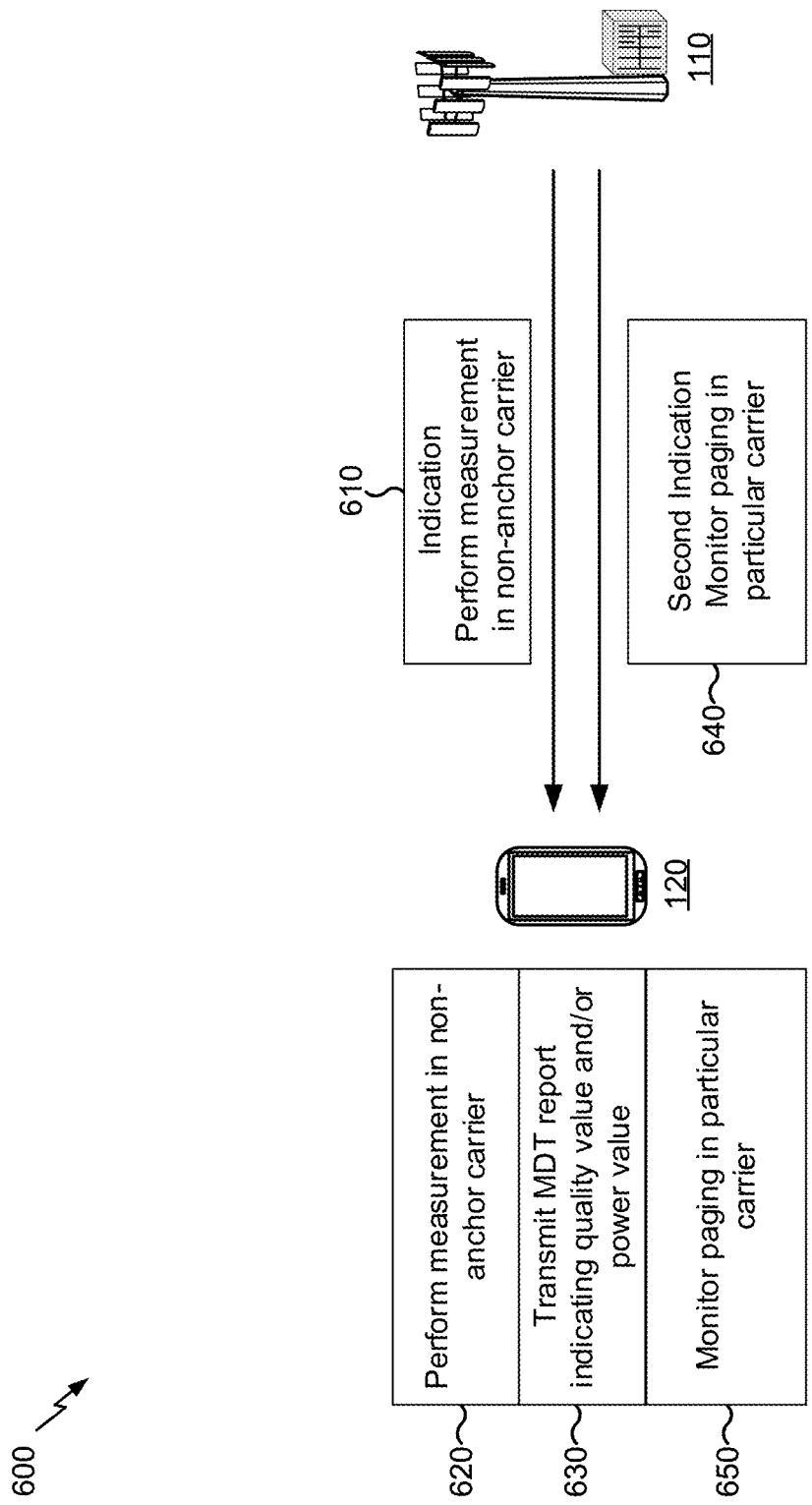
FIG. 6 is a diagram illustrating an example of RRM for paging in a non-anchor carrier, in accordance with various aspects of the present disclosure.

FIG. 6 is a diagram illustrating an example 600 of RRM for paging in a non-anchor carrier, in accordance with various aspects of the present disclosure. As shown, example 600 may include a BS 110 and a UE 120. The BS 110 may provide one or more anchor carriers and one or more non-anchor carriers for the UE 120. Example 600 relates to providing UE feedback regarding quality, power level, etc. of non-anchor carriers so that a BS 110 may configure the placement and/or number of non-anchor carriers, thereby improving network performance and reducing interference.

As shown by reference number 610, the BS 110 may provide an indication to the UE 120. The indication may indicate that the UE 120 is to perform a measurement in a non-anchor carrier. In some aspects, the BS 110 may broadcast the indication to multiple, different UEs. In some aspects, the indication may explicitly identify the non-anchor carrier. In some aspects, the indication may indicate that the UE 120 (or any recipient UE 120) is to perform the measurement for a current non-anchor carrier of the UE 120. In some aspects, the indication may identify particular measurements to be performed (e.g., by all UEs 120, for particular non-anchor carriers, and/or the like). In some aspects, the indication may be system information, an RRC message, and/or the like.

As shown by reference number 620, the UE 120 may perform a measurement in the non-anchor carrier. For example, the UE 120 may determine a quality value and/or a power value of the non-anchor carrier. In some aspects, the UE 120 may determine another value, such as an access failure associated with the non-anchor carrier, a radio link failure associated with the non-anchor carrier, a paging failure associated with the non-anchor carrier, and/or the like.

As shown by reference number 630, the UE 120 may transmit a minimization of drive test (MDT) report that indicates the quality value and/or the power value. In some aspects, the UE 120 may transmit information that indicates the quality value and/or the power value. In some aspects, the MDT report may include an indication that indicates that the reported measurements are for the non-anchor carrier. In some aspects, the MDT report (e.g., the information) may identify an access failure, a radio link failure, a paging failure, and/or the like. In some aspects, the MDT report may include the aforementioned information for one or more of non-anchor carriers and anchor carriers.

As shown by reference number 640, the UE 120 may receive a second indication from the BS 110. In some aspects, the second indication may be unicast to the UE 120. In some aspects, the second indication may be broadcast to the UE 120. The second indication may indicate that the UE 120 is to monitor paging in a particular carrier. For example, the particular carrier may be the same carrier as the non-anchor carrier described above, or can be a different carrier than the non-anchor carrier described above. For example, the BS 110 may redirect the UE 120 to monitor paging in a different carrier. In some aspects, the second indication may indicate that the UE 120 is to perform a measurement in the particular carrier. Thus, the BS 110 may configure UEs 120 to perform measurements of specified non-anchor carriers, which may permit the BS 110 to identify interference (e.g., from illegal interferers or from other sources).

In some aspects, the BS 110 may configure one or more non-anchor carriers based at least in part on the measurements. For example, the BS 110 may change a frequency of a non-anchor carrier, may activate or deactivate a non-anchor carrier, and/or the like. Thus, the BS 110 may improve network performance and reduce interference based at least in part on measurements regarding non-anchor carriers received from UEs 120.

As shown by reference number 650, the UE 120 may monitor paging in the particular carrier. In some aspects, the UE 120 may perform a measurement in the particular carrier. For example, the UE 120 may report the measurement (e.g., and/or other information described above) to the BS 110, which enables further reconfiguration of the non-anchor carriers. In this way, network performance is improved and interference on non-anchor carriers is reduced.

In some aspects, the UE 120 may monitor or perform the measurement in the particular carrier for a length of time or a number of cycles. For example, the UE 120 may monitor or perform the measurement on the particular carrier for a particular length of time or a particular number of discontinuous reception cycles, and may not monitor or perform the measurement on the particular carrier thereafter. In some aspects, each cell where the particular carrier is used may be associated with a respective timer. In such a case, the BS 110 may store information identifying carriers (e.g., NB-IoT carriers) that the UE 120 has determined may suffer from jamming. In this way, storage resources of the UE 120 and the BS 110 are conserved that would otherwise be used to store a larger number of configurations with regard to particular carriers.

As indicated above, FIG. 6 is provided as an example. Other examples may differ from what is described with respect to FIG. 6.

Figure 7:
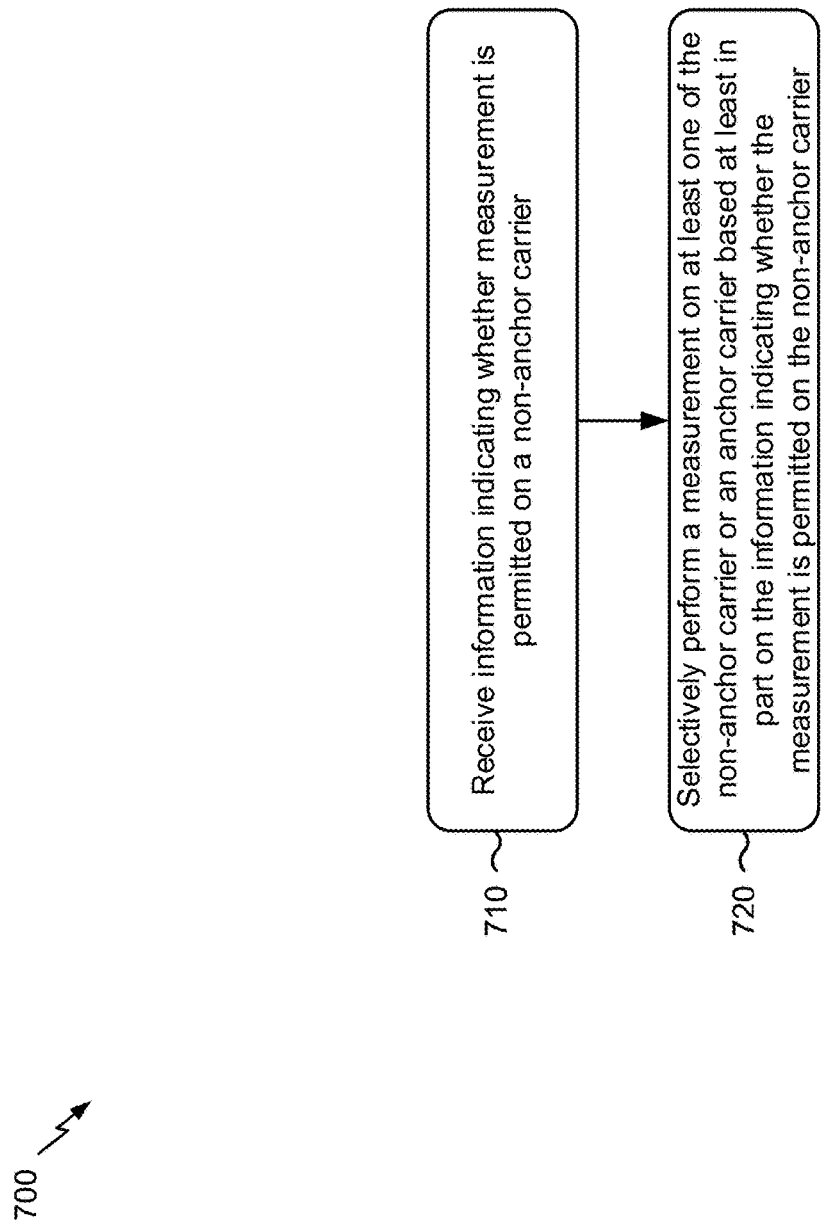
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs RRM for paging in a non-anchor carrier.

As shown in FIG. 7, in some aspects, process 700 may include receiving information indicating whether measurement is permitted on a non-anchor carrier (block 710). For example, the UE (e.g., using antenna 252, DEMOD 254, MIMO detector 256, receive processor 258, controller/processor 280, and/or the like) may receive information indicating whether a measurement is permitted on a non-anchor carrier. In some aspects, the information may indicate that the measurement is permitted on the non-anchor carrier. In some aspects, the information may indicate that the measurement is not permitted on the non-anchor carrier. In some aspects, the information may relate to a single carrier. In some aspects, the information may relate to multiple non-anchor carriers (e.g., a plurality of non-anchor carriers, all non-anchor carriers, etc.).

As shown in FIG. 7, in some aspects, process 700 may include selectively performing a measurement on at least one of the non-anchor carrier or an anchor carrier, based at least in part on the information indicating whether the measurement is permitted on the non-anchor carrier (block 720). For example, the UE (e.g., using antenna 252, DEMOD 254, MIMO detector 256, receive processor 258, controller/processor 280, and/or the like) may perform a measurement on the non-anchor carrier or on an anchor carrier. In some aspects, the UE may determine whether the measurement is to be performed on the non-anchor carrier or on the anchor carrier based at least in part on the information indicating whether the measurement is permitted on the non-anchor carrier. In some aspects, the UE may receive paging on the anchor carrier or the non-anchor carrier based at least in part on the information.

Process 700 may include additional aspects, such as any single aspect or any combination of aspects described below and/or in connection with one or more other processes described elsewhere herein.

In a first aspect, the UE may perform a cell selection or cell reselection procedure based at least in part on the measurement.

In a second aspect, alone or in combination with the first aspect, the information is received as system information.

In a third aspect, alone or in combination with one or more of the first and second aspects, one or more parameters for a cell selection or reselection procedure are different when the measurement is performed on the anchor carrier than when the measurement is performed on the non-anchor carrier.

In a fourth aspect, alone or in combination with one or more of the first through third aspects, the non-anchor carrier is one of a plurality of non-anchor carriers. In some aspects, one or more parameters for a cell selection or reselection procedure are different for one or more non-anchor carriers of the plurality of non-anchor carriers.

In a fifth aspect, alone or in combination with one or more of the first through fourth aspects, the UE may receive information identifying the one or more parameters.

In a sixth aspect, alone or in combination with one or more of the first through fifth aspects, the UE may determine a value for the anchor carrier based at least in part on performing the measurement on the non-anchor carrier.

In a seventh aspect, alone or in combination with one or more of the first through sixth aspects, the UE may determine a value for the non-anchor carrier based at least in part on performing the measurement on the anchor carrier.

In an eighth aspect, alone or in combination with one or more of the first through seventh aspects, the UE may perform a measurement on the anchor carrier according to a periodicity or a discontinuous reception cycle of the UE.

In a ninth aspect, alone or in combination with one or more of the first through eighth aspects, selectively performing the measurement on at least one of the non-anchor carrier or the anchor carrier comprises: performing the measurement on the non-anchor carrier based at least in part on the UE being in a relaxed monitoring state with regard to the anchor carrier.

In a tenth aspect, alone or in combination with one or more of the first through ninth aspects, the UE may exit the relaxed monitoring state based at least in part on a value that is determined based at least in part on applying an offset to a non-anchor carrier measurement.

In an eleventh aspect, alone or in combination with one or more of the first through tenth aspects, the offset is determined based at least in part on an anchor carrier measurement and a previous non-anchor carrier measurement.

In a twelfth aspect, alone or in combination with one or more of the first through eleventh aspects, the offset is configured by a network.

In a thirteenth aspect, alone or in combination with one or more of the first through twelfth aspects, the UE may enter the relaxed monitoring state based at least in part on an anchor carrier measurement.

In a fourteenth aspect, alone or in combination with one or more of the first through thirteenth aspects, the UE may enter the relaxed monitoring state based at least in part on an anchor carrier measurement; exit the relaxed monitoring state based at least in part on a non-anchor carrier measurement; and optionally apply an offset to the non-anchor carrier measurement when exiting the relaxed monitoring state based at least in part on the non-anchor carrier measurement.

In a fifteenth aspect, alone or in combination with one or more of the first through fourteenth aspects, the UE may determine that a change in a measurement value for the anchor carrier satisfies a corresponding threshold, wherein the measurement value is determined by performing the measurement on the non-anchor carrier; and skip the measurement on the anchor carrier based at least in part on determining that the measurement value or the change in the measurement value for the non-anchor carrier satisfies the threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
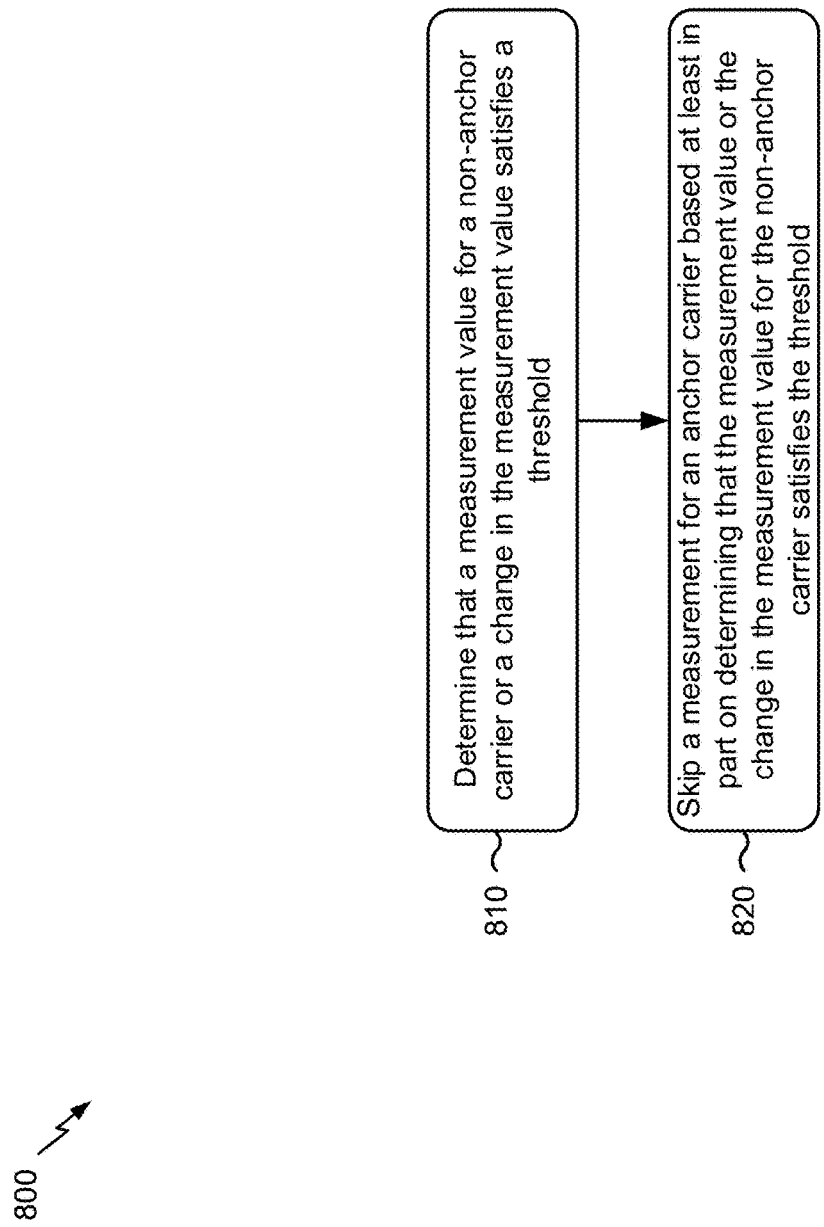
FIG. 8 is another diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs RRM for paging in a non-anchor carrier.

As shown in FIG. 8, in some aspects, process 800 may include determining that a measurement value for a non-anchor carrier or a change in the measurement value satisfies a threshold (block 810). For example, the UE (e.g., using antenna 252, DEMOD 254, MIMO detector 256, receive processor 258, controller/processor 280, and/or the like) may determine that a measurement value, or a change in a measurement value, for a non-anchor carrier satisfies a threshold. In some aspects, the threshold for the measurement value may be different than a threshold for the change in the measurement value.

As shown in FIG. 8, in some aspects, process 800 may include skipping a measurement for an anchor carrier based at least in part on determining that the measurement value or the change in the measurement value for the non-anchor carrier satisfies the threshold (block 820). For example, the UE (e.g., using antenna 252, DEMOD 254, MIMO detector 256, receive processor 258, controller/processor 280, and/or the like) may skip a measurement for an anchor carrier based at least in part on determining that the measurement value for the non-anchor carrier, or the change in the measurement value for the non-anchor carrier, satisfies the threshold. In some aspects, the UE may downsample the measurement for the anchor carrier.

Process 800 may include additional aspects, such as any single aspect or any combination of aspects described below and/or in connection with one or more other processes described elsewhere herein.

In a first aspect, the UE skips the measurement for the anchor carrier further based at least in part on determining that the change in the measurement value for the anchor carrier satisfies the corresponding threshold.

In a second aspect, alone or in combination with the first aspect, the UE may determine that a change in a measurement value for the anchor carrier satisfies a corresponding threshold; and determine the threshold for the non-anchor carrier based at least in part on determining that the change in the measurement value for the anchor carrier satisfies the corresponding threshold.

In a third aspect, alone or in combination with one or more of the first and second aspects, the method further comprises: determining that the measurement value for the non-anchor carrier does not satisfy the threshold; and performing the measurement for the anchor carrier based at least in part on the measurement value for the non-anchor carrier not satisfying the threshold.

In a fourth aspect, alone or in combination with one or more of the first through third aspects, the UE may adjust the threshold for a period of time.

In a fifth aspect, alone or in combination with one or more of the first through fourth aspects, the measurement for the anchor carrier is part of a periodic measurement, and skipping the measurement further comprises skipping a subset of measurements of the periodic measurement.

In a sixth aspect, alone or in combination with one or more of the first through fifth aspects, skipping the subset of measurements further comprises: performing at least one measurement of the periodic measurement based at least in part on a discontinuous reception cycle of the UE.

In a seventh aspect, alone or in combination with one or more of the first through sixth aspects, the UE may receive information indicating that measurement is permitted on the non-anchor carrier; and perform a measurement on the non-anchor carrier to determine the measurement value for the non-anchor carrier based at least in part on the information indicating that the measurement is permitted on the non-anchor carrier.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
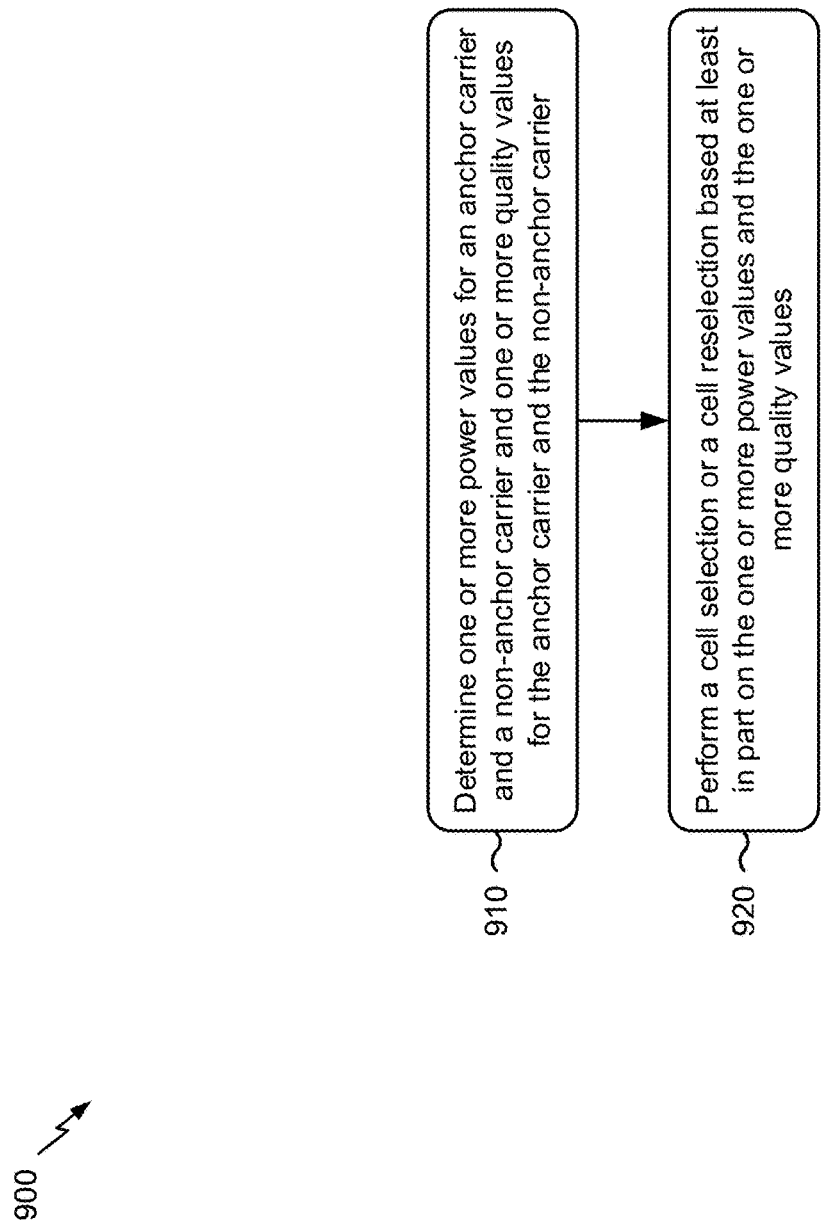
FIG. 9 is another diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs RRM for paging in a non-anchor carrier.

As shown in FIG. 9, in some aspects, process 900 may include determining one or more power values for an anchor carrier and a non-anchor carrier and one or more quality values for the anchor carrier and the non-anchor carrier (block 910). For example, the UE (e.g., using controller/processor 280 and/or the like) may determine one or more power values for an anchor carrier and a non-anchor carrier. The UE may determine one or more quality values for the anchor carrier and the non-anchor carrier.

As shown in FIG. 9, in some aspects, process 900 may include performing a cell selection or a cell reselection based at least in part on the one or more power values and the one or more quality values (block 920). For example, the UE (e.g., using controller/processor 280 and/or the like) may perform a cell selection or a cell reselection based at least in part on the one or more power values and the one or more quality values. For example, the UE may perform a cell reselection based at least in part on a power value for the anchor carrier, a power value for the non-anchor carrier, a quality value for the anchor carrier, and a quality value for the non-anchor carrier.

Process 900 may include additional aspects, such as any single aspect or any combination of aspects described below and/or in connection with one or more other processes described elsewhere herein.

In a first aspect, determining the one or more power values and the one or more quality values further comprises: determining a power value and/or a quality value for an anchor carrier of a neighbor cell. In some aspects, performing the cell reselection is based at least in part on the power value and/or the quality value.

In a second aspect, alone or in combination with the first aspect, the UE may store the one or more power values for the non-anchor carrier or the one or more quality values for the non-anchor carrier for a length of time.

In a third aspect, alone or in combination with one or more of the first and second aspects, performing the cell selection or the cell reselection is based at least in part on comparing the stored one or more power values and the stored one or more quality values for the non-anchor carrier to a power value or quality value of a neighbor cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with various aspects of the present disclosure. Example process 1000 is an example where a UE (e.g., UE 120) performs RRM for paging in a non-anchor carrier.

As shown in FIG. 10, in some aspects, process 1000 may include receiving an indication from a base station, wherein the indication identifies a non-anchor carrier (block 1010). For example, the UE (e.g., using antenna 252, DEMOD 254, MIMO detector 256, receive processor 258, controller/processor 280, and/or the like) may receive an indication from a base station (e.g., BS 110). The indication may identify a non-anchor carrier. The indication may identify the non-anchor carrier for the UE to perform a measurement or monitor the non-anchor carrier.

As shown in FIG. 10, in some aspects, process 1000 may include transmitting a power value or a quality value for the non-anchor carrier to the base station (block 1020). For example, the UE (e.g., using controller/processor 280, transmit processor 264, TX MIMO processor 266, MOD 254, antenna 252, and/or the like) may transmit a power value or a quality value for the non-anchor carrier to the base station. In some aspects, the UE may transmit information identifying the power value or the quality value. In some aspects, the UE may transmit a MDT report that identifies the power value or the quality value.

Process 1000 may include additional aspects, such as any single aspect or any combination of aspects described below and/or in connection with one or more other processes described elsewhere herein.

In a first aspect, the UE may monitor paging on a particular carrier based at least in part on a second indication received from the base station, wherein the second indication is based at least in part on the power value or the quality value.

In a second aspect, alone or in combination with the first aspect, the second indication identifies the particular carrier, wherein the particular carrier is different than the non-anchor carrier.

In a third aspect, alone or in combination with one or more of the first and second aspects, monitoring paging on the particular carrier based at least in part on the second indication further comprises: monitoring the paging on the particular carrier for a particular length of time.

In a fourth aspect, alone or in combination with one or more of the first through third aspects, the non-anchor carrier is the particular carrier.

In a fifth aspect, alone or in combination with one or more of the first through fourth aspects, the indication indicates to perform a measurement for one or more carriers including the non-anchor carrier.

In a sixth aspect, alone or in combination with one or more of the first through fifth aspects, the UE may transmit information identifying at least one of an access failure, a radio link failure, or a paging failure to the base station.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving information indicating whether a power measurement is permitted on a non-anchor carrier; and
selectively performing the power measurement on at least one of the non-anchor carrier or an anchor carrier based at least in part on the information indicating whether the power measurement is permitted on the non-anchor carrier,
wherein selectively performing the power measurement on at least one of the non-anchor carrier or the anchor carrier comprises: performing the power measurement on the non-anchor carrier based at least in part on the UE being in a relaxed monitoring state with regard to the anchor carrier.

2. The method of claim 1, further comprising:
performing a cell selection or cell reselection procedure based at least in part on the power measurement.

3. The method of claim 1, wherein the information is received as system information.

4. The method of claim 1, wherein one or more parameters for a cell selection or reselection procedure are different when the power measurement is performed on the anchor carrier than when the power measurement is performed on the non-anchor carrier.

5. The method of claim 1, wherein the non-anchor carrier is one of a plurality of non-anchor carriers, and wherein one or more parameters for a cell selection or reselection procedure are different for one or more non-anchor carriers of the plurality of non-anchor carriers.

6. The method of claim 5, further comprising:
receiving information identifying the one or more parameters.

7. The method of claim 1, further comprising:
determining a value for the anchor carrier based at least in part on performing the power measurement on the non-anchor carrier.

8. The method of claim 1, further comprising:
determining a value for the non-anchor carrier based at least in part on performing the power measurement on the anchor carrier.

9. The method of claim 1, further comprising:
performing a measurement on the anchor carrier according to a periodicity or a discontinuous reception cycle of the UE.

10. The method of claim 1, further comprising:
exiting the relaxed monitoring state based at least in part on a value that is determined based at least in part on applying an offset to a non-anchor carrier measurement.

11. The method of claim 10, wherein the offset is determined based at least in part on an anchor carrier measurement and a previous non-anchor carrier measurement.

12. The method of claim 10, wherein the offset is configured by a network.

13. The method of claim 1, further comprising:
entering the relaxed monitoring state based at least in part on an anchor carrier measurement.

14. The method of claim 1, further comprising:
entering the relaxed monitoring state based at least in part on an anchor carrier measurement;
exiting the relaxed monitoring state based at least in part on a non-anchor carrier measurement; and
optionally applying an offset to the non-anchor carrier measurement when exiting the relaxed monitoring state based at least in part on the non-anchor carrier measurement.

15. The method of claim 1, further comprising:
determining that a measurement value for the non-anchor carrier or a change in the measurement value satisfies a threshold, wherein the measurement value is determined by performing the power measurement on the non-anchor carrier; and
skipping the power measurement on the anchor carrier based at least in part on determining that the measurement value or the change in the measurement value for the non-anchor carrier satisfies the threshold.

16. A method of wireless communication performed by a user equipment (UE), comprising:
determining that a measurement value for a non-anchor carrier or a change in the measurement value satisfies a threshold;
determining that a change in a measurement value for an anchor carrier satisfies a corresponding threshold; and
skipping a measurement for the anchor carrier based at least in part on:
determining that the measurement value or the change in the measurement value for the non-anchor carrier satisfies the threshold, and
determining that the change in the measurement value for the anchor carrier satisfies the corresponding threshold.

17. The method of claim 16, further comprising:
determining the threshold for the non-anchor carrier based at least in part on determining that the change in the measurement value for the anchor carrier satisfies the corresponding threshold.

18. The method of claim 16, wherein the method further comprises:
determining that the measurement value for the non-anchor carrier does not satisfy the threshold; and
performing the measurement for the anchor carrier based at least in part on the measurement value for the non-anchor carrier not satisfying the threshold.

19. The method of claim 18, further comprising:
adjusting the threshold for a period of time.

20. The method of claim 16, wherein the measurement for the anchor carrier is part of a periodic measurement, and wherein skipping the measurement further comprises:
skipping a subset of measurements of the periodic measurement.

21. The method of claim 20, wherein skipping the subset of measurements further comprises:
performing at least one measurement of the periodic measurement based at least in part on a discontinuous reception cycle of the UE.

22. The method of claim 21, further comprising:
receiving information indicating that measurement is permitted on the non-anchor carrier; and
performing a measurement on the non-anchor carrier to determine the measurement value for the non-anchor carrier based at least in part on the information indicating that the measurement is permitted on the non-anchor carrier.

23. A user equipment (UE) for wireless communication, comprising:
a memory; and
one or more processors coupled to the memory, the memory and the one or more processors configured to:

receive information indicating whether a power measurement is permitted on a non-anchor carrier; and
selectively perform the power measurement on at least one of the non-anchor carrier or an anchor carrier based at least in part on the information indicating whether the power measurement is permitted on the non-anchor carrier,
wherein the memory and the one or more processors, when selectively performing the power measurement on at least one of the non-anchor carrier or the anchor carrier, are to: perform the power measurement on the non-anchor carrier based at least in part on the UE being in a relaxed monitoring state with regard to the anchor carrier.

24. A user equipment (UE) for wireless communication, comprising:
a memory; and
one or more processors coupled to the memory, the memory and the one or more processors configured to:
determine that a measurement value for a non-anchor carrier or a change in the measurement value satisfies a threshold;
determine that a change in a measurement value for an anchor carrier satisfies a corresponding threshold; and
skip a measurement for the anchor carrier based at least in part on:
the measurement value or the change in the measurement value for the non-anchor carrier being determined to satisfy the threshold, and
the change in the measurement value for the anchor carrier being determined to satisfy the corresponding threshold.

25. An apparatus for wireless communication, comprising:
means for receiving information indicating whether a power measurement is permitted on a non-anchor carrier; and
means for selectively performing the power measurement on at least one of the non-anchor carrier or an anchor carrier based at least in part on the information indicating whether the power measurement is permitted on the non-anchor carrier,
wherein selectively performing the power measurement on at least one of the non-anchor carrier or the anchor carrier comprises: performing the power measurement on the non-anchor carrier based at least in part on the UE being in a relaxed monitoring state with regard to the anchor carrier.

26. An apparatus for wireless communication, comprising:
means for determining that a measurement value for a non-anchor carrier or a change in the measurement value satisfies a threshold;
means for determining that a change in a measurement value for an anchor carrier satisfies a corresponding threshold; and
means for skipping a measurement for the anchor carrier based at least in part on:
determining that the measurement value or the change in the measurement value for the non-anchor carrier satisfies the threshold, and
determining that the change in the measurement value for the anchor carrier satisfies the corresponding threshold.

27. The method of claim 1, further comprising:
exiting the relaxed monitoring state based at least in part on a non-anchor carrier measurement or an anchor carrier measurement.

28. The UE of claim 23, wherein the memory and the one or more processors are further configured to:
determine a value for the anchor carrier based at least in part on performing the power measurement on the non-anchor carrier.

29. The UE of claim 23, wherein the memory and the one or more processors are further configured to:
exit the relaxed monitoring state based at least in part on a non-anchor carrier measurement or an anchor carrier measurement.

30. A non-transitory computer-readable medium storing one or more instructions for wireless communication, the one or more instructions comprising:
one or more instructions that, when executed by one or more processors of a user equipment (UE), cause the one or more processors to:
receive information indicating whether a power measurement is permitted on a non-anchor carrier; and
selectively perform the power measurement on at least one of the non-anchor carrier or an anchor carrier based at least in part on the information indicating whether the power measurement is permitted on the non-anchor carrier,
wherein the one or more instructions that cause the one or more processors to selectively perform the power measurement on at least one of the non-anchor carrier or the anchor carrier cause the one or more processors to: perform the power measurement on the non-anchor carrier based at least in part on the UE being in a relaxed monitoring state with regard to the anchor carrier.

31. The non-transitory computer-readable medium of claim 30, wherein the one or more instructions, when executed by the one or more processors, further cause the one or more processors to:
determine a value for the anchor carrier based at least in part on performing the power measurement on the non-anchor carrier.

32. The non-transitory computer-readable medium of claim 30, wherein the one or more instructions, when executed by the one or more processors, further cause the one or more processors to:
exit the relaxed monitoring state based at least in part on a non-anchor carrier measurement or an anchor carrier measurement.

* * * * *